(12) United States Patent
Shim

(10) Patent No.: US 6,333,902 B1
(45) Date of Patent: Dec. 25, 2001

(54) METHOD FOR GENERATING LAND/ GROOVE SWITCHING SIGNAL FROM POLG TYPE DISC AND APPARATUS THEREFOR

(75) Inventor: Jae-seong Shim, Seoul (KR)

(73) Assignee: Samsung Electronics., Ltd., Suwon (KR)

( * ) Notice: Subject to any disclaimer, the term of this patent is extended or adjusted under 35 U.S.C. 154(b) by 0 days.

(21) Appl. No.: 09/293,891

(22) Filed: Apr. 19, 1999

(30) Foreign Application Priority Data

Apr. 17, 1998 (KR) .................................................. 98-13839

(51) Int. Cl.⁷ ...................................................... G11B 7/00
(52) U.S. Cl. .................................... 369/47.54; 369/47.23; 369/53.22; 369/44.26
(58) Field of Search .............................. 369/44.26, 44.27, 369/275.3, 275.4, 53.2, 53.22, 53.23, 47.23, 47.24, 47.54, 44.29, 44.35

(56) References Cited

U.S. PATENT DOCUMENTS

| | | | |
|---|---|---|---|
| 5,537,373 | 7/1996 | Horikiri | 369/44.13 |
| 5,930,228 | 7/1999 | Miyamoto et al. | 369/275.4 |
| 5,936,933 | 8/1999 | Miyamoto et al. | 369/275.3 |
| 6,088,307 * | 7/2000 | Fushimi et al. | 369/44.26 |
| 6,091,678 * | 7/2000 | Fushimi et al. | 369/44.26 |

FOREIGN PATENT DOCUMENTS

| | | |
|---|---|---|
| 0 757 343 A1 | 2/1997 | (EP) . |
| 0 821 350 A2 | 1/1998 | (EP) . |
| 0 881 632 A2 | 12/1998 | (EP) . |
| 0 886 265 A2 | 12/1998 | (EP) . |
| 0 899 738 A2 | 3/1999 | (EP) . |
| 2 312 320 | 10/1997 | (GB) . |
| 9-282669 | 10/1997 | (JP) . |
| 10-27355 | 1/1998 | (JP) . |
| 10-91967 | 4/1998 | (JP) . |
| 2788789 | 6/1998 | (JP) . |
| WO96/25736 | 8/1996 | (WO) . |
| WO 98/19302 | 5/1998 | (WO) . |

\* cited by examiner

Primary Examiner—Thang V. Tran
(74) Attorney, Agent, or Firm—Staas & Halsey, LLP

(57) ABSTRACT

A method for generating a land/groove (L/G) switching signal from pits on a land/groove (POLG) type disc and an apparatus therefor. In the method for generating an L/G switching signal from pits on a POLG type disc having tracks with wobbles, in which header information is recorded in sectors of each track, the header information including physical identification data (PID) and a peak header and a bottom header distinguished by envelopes of the peak header signal and the bottom header signal and both the peak and bottom header signals having phases according to lands or grooves, the phases of the peak header signal and the bottom header signal are compared to determine a track switching point and the sequence of sectors is determined using the physical identification data of the disc. Then, the number of sectors included in each track is counted based on the number of wobble signal cycles reproduced from the disc, to determine a track switching point and a land/groove (L/G) switching signal is generated corresponding to the results of these steps. Therefore, a L/G switching point is accurately determined using the continuity of the PID and the number of wobbles signal cycles so that precise tracking control can be achieved.

30 Claims, 13 Drawing Sheets

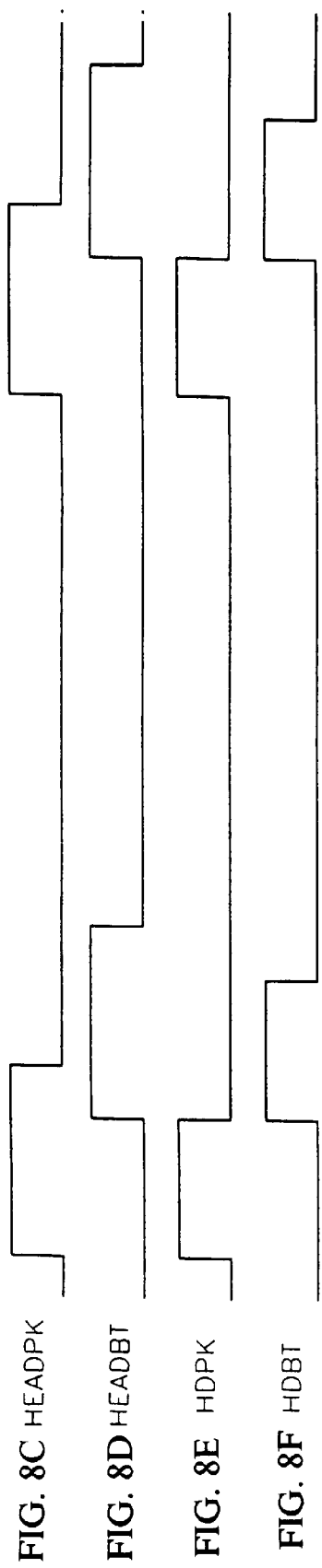

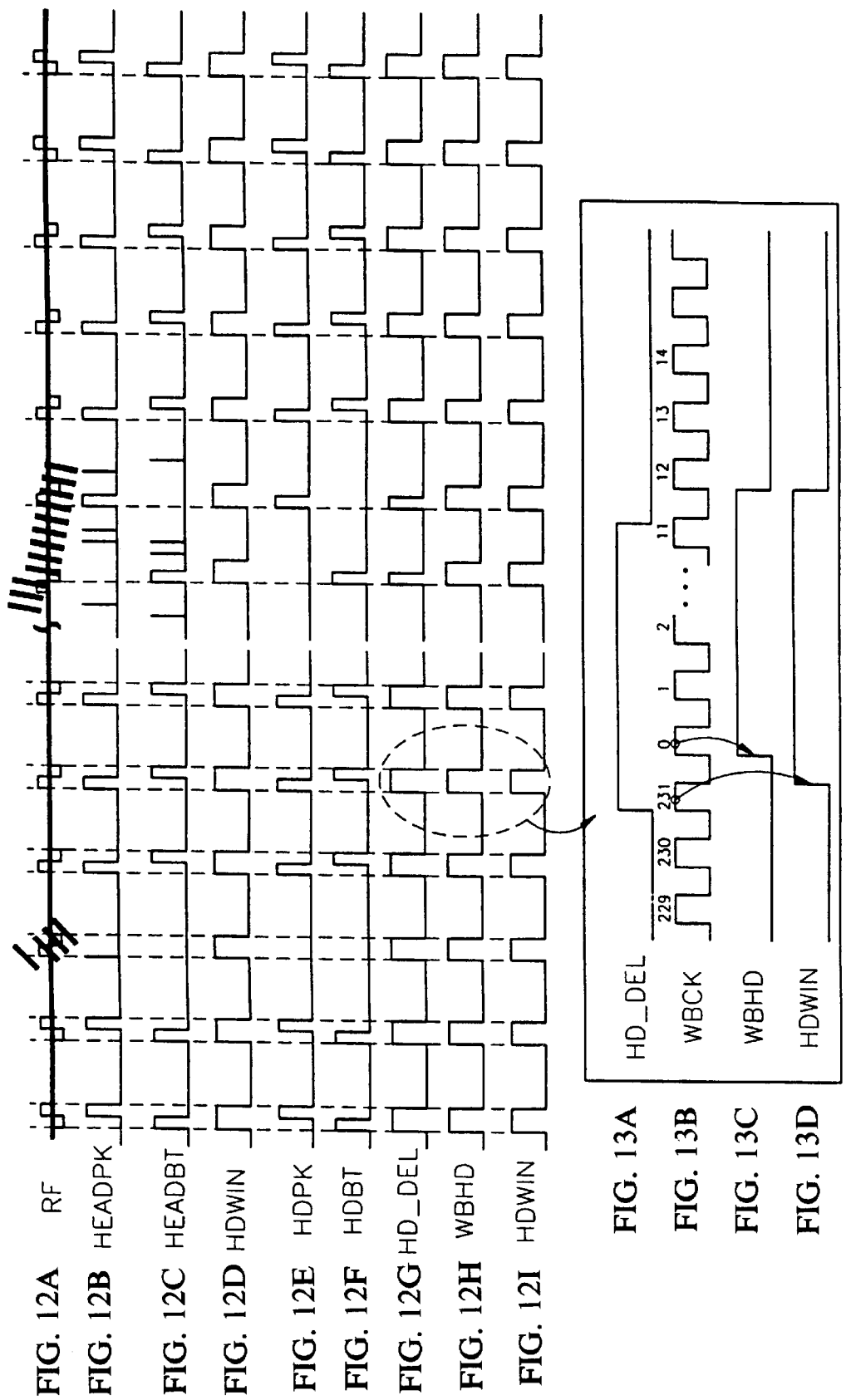

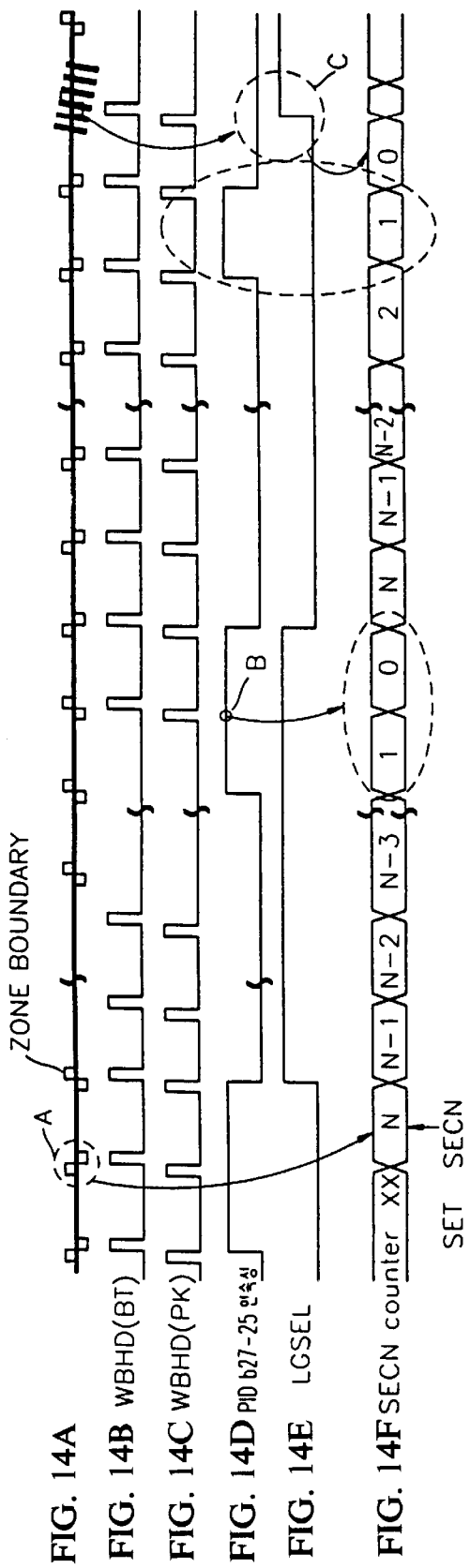

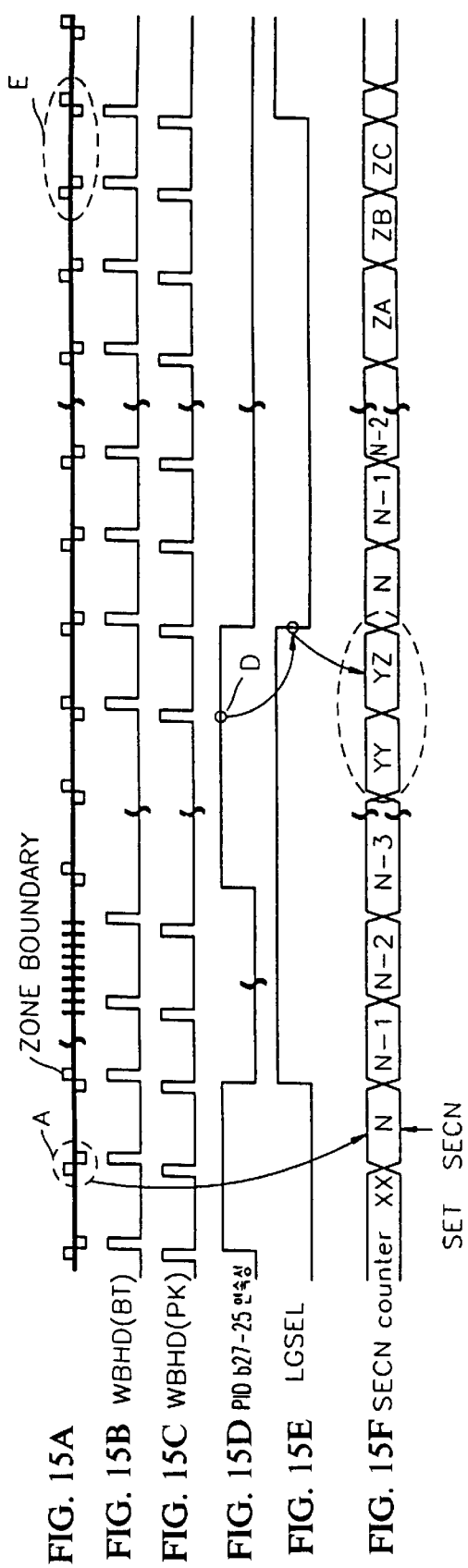

METHOD FOR GENERATING LAND/GROOVE SWITCHING SIGNAL FROM POLG TYPE DISC AND APPARATUS THEREFOR

CROSS-REFERENCE TO RELATED APPLICATIONS

This application claims the benefit of Korean Application No. 98-13839, filed Apr. 17, 1998, in the Korean Patent Office, the disclosure of which is incorporated herein by reference.

BACKGROUND OF THE INVENTION

1. Field of the Invention

The present invention relates to optical disc reproduction and more particularly, to a method for generating a land/groove switching signal from pits on a land/groove (POLG) type disc and an apparatus therefor.

2. Description of the Related Art

In general, a read only memory digital video disc (DVD-ROM) has pits on a planar surface as opposed to a groove formed along tracks of the disc. So, the DVD-ROM is called a non-groove type optical disc.

As the need for recording a large quantity of information on an optical disc increases, a high-density recording medium is required. Accordingly, a POLG type optical disc such as a random access memory digital video disc (DVD-RAM), in which pits are formed on lands and grooves of the disc, has been suggested.

In a disc such as a DVD-RAM, information is recorded in the form of sector units. Each sector is roughly divided into a header information region having physical identification data (PID) and a user data region. Accordingly, the header information or user data contained in a radio frequency (RF) signal is read by a pickup and processed separately.

FIGS. 1A and 1B show the recording pattern of the header information on a DVD-RAM disc. In detail, FIG. 1A shows the header information recorded in the first sector of the track and FIG. 1B shows the header information recorded in other sectors.

In FIGS. 1A and 1B, reference numeral 50 represents a header information region and reference numeral 52 represents a user data region. The header information region 50 is divided into a peak header region 50a and a bottom header region 50b. The user data region 52 is divided into land and groove regions. A land/groove switching signal, which indicates a switch from a land track to a groove track or from a groove track to a land track, can be generated according to the sequence of the peak header region 50a and the bottom header region 50b.

Because the phase of a tracking error signal changes by 180° when switching from a land to a groove, a disc reproduction apparatus selects the polarity (phase) of the tracking error signal according to the land/groove switching signal. Also, wobbles exist in the user data region 52. In FIGS. 1A and 1B, the wobbles represent wave-like sidewalls of the tracks (lands and grooves), formed between each land and groove. The wobble signal has information about the reference clock signal for controlling the spindle motor and about a channel clock signal for data playback.

FIG. 2 is a block diagram of a conventional land/groove switching signal generating apparatus.

The apparatus of FIG. 2 includes a pickup (P/U) 602, a radio frequency amplifier (AMP) 603, an offset compensator 604, an eight-to-fourteen modulation (EFM) comparator 606, an EFM phase-locked loop (EFM PLL) 607, a header envelope extractor 605, an amplitude modulation (AM) detector & header region information extractor 608, a phase comparator 609 and a tracking servo 610.

The apparatus shown in FIG. 2 operates as follows. An RF signal, output via a disc 601, the P/U 602 and the RF AMP 603, is provided to the offset compensator 604. The offset compensator 604 removes offset based on the central point of the EFM signal, regardless of whether the signal is from the header information region or the user data region, to output an EFM signal from which the offset has been removed. The EFM signal output from the offset compensator 604 is input to the EFM comparator 606.

FIG. 3 is a detailed block diagram of the EFM comparator 606. The EFM comparator 606 includes a first comparator 70, a low-pass filter (LPF) 72, a differential amplifier 74 and a gain determiner 76.

The first comparator 70 compares the EFM signal EFM output from the offset compensator 604 with a slice level Vp which is determined based on a feedback EFM signal EFMS and outputs a binary EFM signal EFMS according to the result of the comparison. That is, if the EFM signal EFM output from the offset compensator 604 is equal to or greater than the slice level Vp, the EFMS signal is output as a logic "1" value. Otherwise, the EFM signal is output as a logic "0" value.

The LPF 72 low-pass filters the feedback signal EFMS output from the first comparator 70 to obtain the average level thereof. Here, the LPF 72 has filtering characteristics corresponding to multiple speeds of the disc 601. This is because the amplitude and frequency of the EFM signal change according to the reproduction speed of the disc 601.

The differential amplifier 74 outputs the slice level Vp amplified from the difference between the output of the LPF 72 and a predetermined reference voltage Vref to the negative input terminal of the first comparator 70 and the gain determiner 76. Here, the predetermined reference voltage Vref represents a slice level when there is no offset. The gain determiner 76 determines the gain of the differential amplifier 74 in proportion to the slice level Vp.

The EFMS signal output from the EFM comparator 606 is input to the EFM PLL 607.

The EFM PLL 607 outputs a channel clock signal PCLK, whose phase is locked by the EFMS signal and data EFML reproduced by the channel clock signal PCLK, to the AM detector & header region information extractor 608. Here, the channel clock PCLK, a channel clock signal of the DVD, has a frequency of 29.16 MHz.

Further, the header envelope extractor 605 extracts a head peak signal HEADPK, indicating a peak header region, and a head bottom signal HEADBT, indicating a bottom header region from the RF signal output from the RF AMP 603, and outputs the extracted signals to the AM detector & header region information extractor 608. The envelope of the peak header has a peak value higher than the average peak level of the RF signal and the envelope of the bottom header has a peak value lower than that of the average peak level of the RF signal so that the signals HEADPK and HEADBT are generated based on the above. Here, rising edges of the signals HEADPK and HEADBT nearly match with the actual rising edges of the peak header and the bottom header. However, falling edges thereof are delayed from the actual falling edges of the peak header and the bottom header. This is because the signals HEADPK and HEADBT are usually generated by an integration method.

The AM detector & header region information extractor 608 extracts a signal HDPK, accurately indicating a peak header region, and a signal HDBT, accurately indicating a bottom header region, from the signals PCLK and EFML output from the EFM PLL 607 and the signals HEADPK and HEADBT, output from the header envelope extractor 605, to output to the phase comparator 609.

The phase comparator 609 compares the phases of the signals HDPK and HDBT and outputs a land/groove switching signal LGSEL indicating the positions of lands and grooves. The land/groove switching signal indicates the position of the track as a groove when the phase of HDPK leads the phase of HDBT. Meanwhile, when the phase of HDBT leads that of HDPK, the land/groove switching signal indicates the position of the track as a land.

The tracking servo 610 performs tracking control while switching the tracking polarity according to the state of the land/groove switching signal. The tracking servo 610 switches the polarity of the tracking error signal according to the land/groove switching signal, hence, accuracy of the land/groove switching signal LGSEL is very important for tracking servo control.

However, the header envelope extractor 605 may output the signals HEADPK and HEADBT in a region outside the actual header region due to unstable tracking control or a disc defect. In this case, the phase comparator 609 of the conventional land/groove switching signal generating apparatus shown in FIG. 2 may generate an incorrect land/groove switching signal based on incorrect HEADPK and HEADBT signals, causing a malfunction of the tracking servo. Accordingly, performance of the overall system becomes unstable.

SUMMARY OF THE INVENTION

To solve the above problems, it is an object of the present invention to provide a method for generating a land/groove switching signal from pits on a land/groove (POLG) type disc in which an incorrect peak header region signal or an incorrect bottom header region signal generated in a region outside a header region is removed by switching the polarity of the land/groove switching signal according to continuity of the physical identification data (PID) of the disc.

It is another object of the present invention to provide an apparatus suitable for the land/groove switching signal generating method.

Accordingly, to achieve the above first object, there is provided a method for generating a land/groove (L/G) switching signal from pits on a land/groove (POLG) type disc having tracks with wobbles in which header information is recorded in sectors of each track, the header information including physical identification data (PID), a peak header and a bottom header distinguished by envelopes of the peak header signal and the bottom header signal and both the peak and bottom header signals having phases corresponding to lands or grooves, comprising the steps of: (a) comparing the phases of the peak header and the bottom header to determine a track switching point; (b) determining the sequence of sectors using the physical identification data of the disc; (c) counting the number of sectors included in each track based on the number of wobble signal cycles reproduced from the disc to determine a track switching point; and (d) generating a land/groove (L/G) switching signal corresponding to the results of the steps (a), (b) and (c).

To achieve the second object, there is provided an apparatus for generating a land/groove (L/G) switching signal from pits on a land/groove (POLG) type disc having lands and grooves, in which data is recorded in a sector having a header information region and a data region, which are distinguished by envelopes of the recorded data signal, the apparatus comprising: a header envelope extractor for extracting a header region signal consisting of a peak header signal indicating a peak header region and a bottom header signal indicating a bottom header region from a radio frequency (RF) signal extracted from the disk; a header window signal generator for generating a header window signal indicating the effective region of header information based on wobble signals of the RF signal; a header region information extractor & physical identification data (PID) reproducer for determining the effective region of the header region signal using the header window signal to reproduce the effective header region signal and the PID; a phase comparator for comparing phases of the peak header signal and the bottom header signal of the effective header region signal to generate a first determination signal; a continuity determiner for determining whether the PID has continuity to generate a second determination signal; a down counter for counting the header window signal cycles to generate a third determination signal; and a land/groove (L/G) switching signal generator for generating a L/G switching signal corresponding to the first through third determination signals.

BRIEF DESCRIPTION OF THE DRAWINGS

The above objects and advantages of the present invention will become more apparent by describing in detail preferred embodiments thereof with reference to the attached drawings in which:

FIGS. 8A through 8F are waveforms showing the relationship between an RF signal, an EFM signal and a header region signal;

FIGS. 12A–12I illustrate waveforms relating to the operation of the wobble counter and the header region information extractor & PID reproducer shown in FIG. 7;

FIGS. 13A–13D illustrate waveforms relating to the operation of the apparatus shown in FIG. 7

FIGS. 14A–14F illustrate waveforms relating to the operation of the apparatus shown in FIG. 7; and FIGS. 15A–15F illustrate waveforms relating to the operation of the apparatus shown in FIG. 7.

DESCRIPTION OF THE PREFERRED EMBODIMENT

Figure 1A:
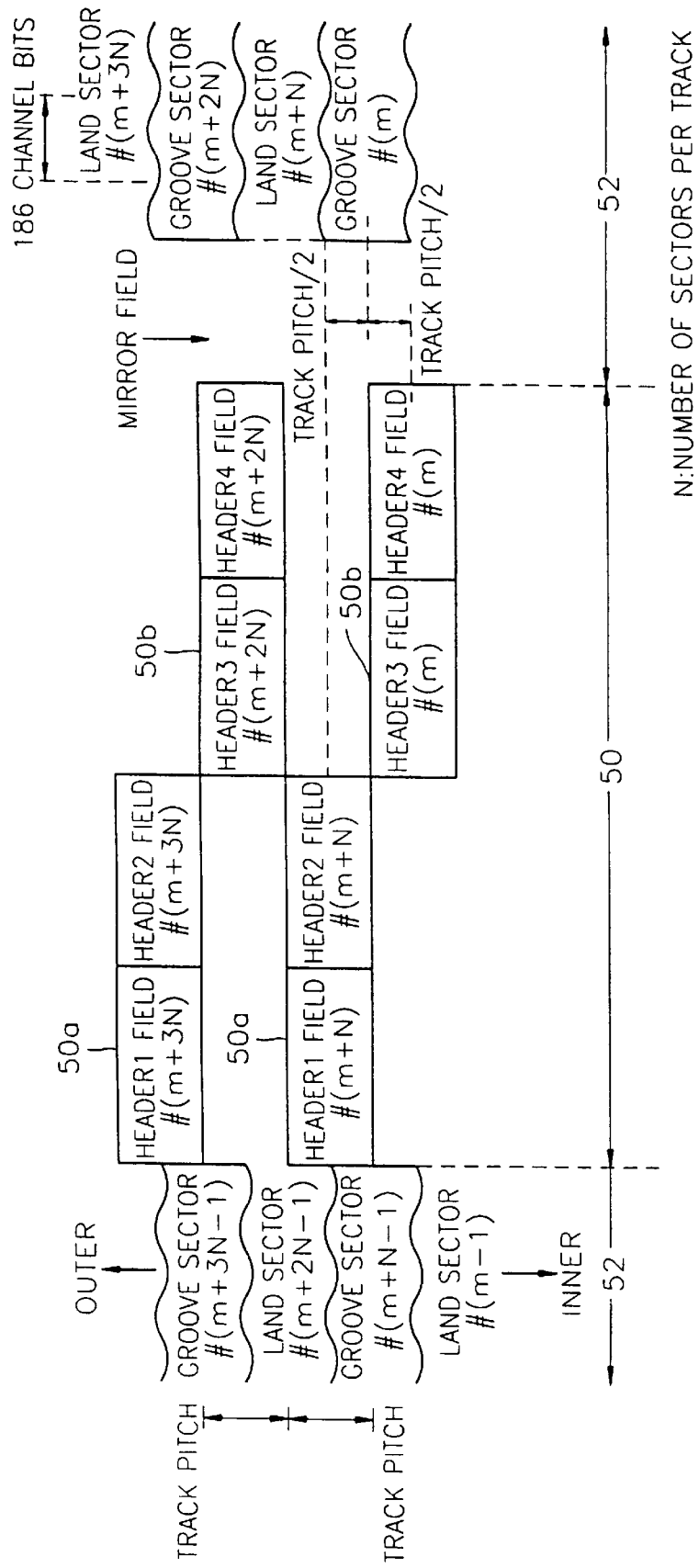
FIGS. 1A and 1B show the recording patterns of header information on a DVD-RAM disc.
Figure 1B:
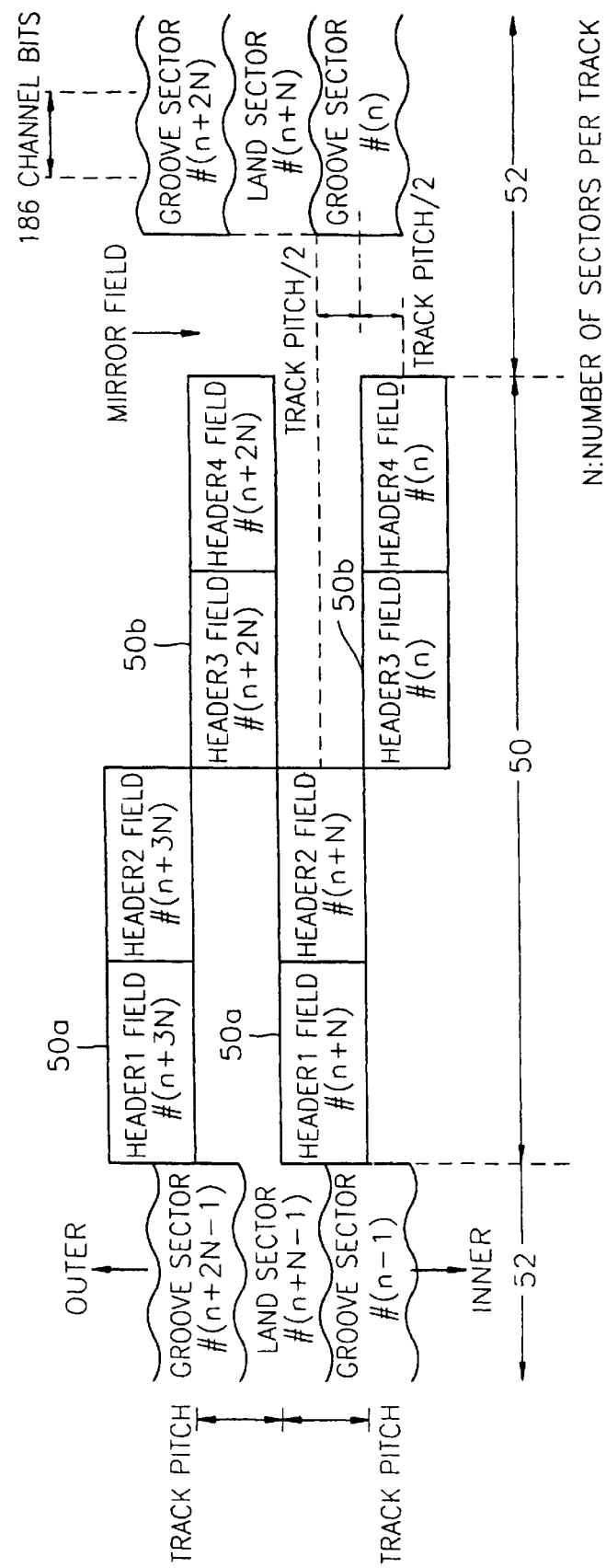

Reference will now made in detail to the embodiment of the present invention, examples of which are illustrated in the accompanying drawings, wherein like reference numerals refer to the like elements throughout. The embodiment is described below in order to explain the present invention by referring to the figures.

Figure 4:
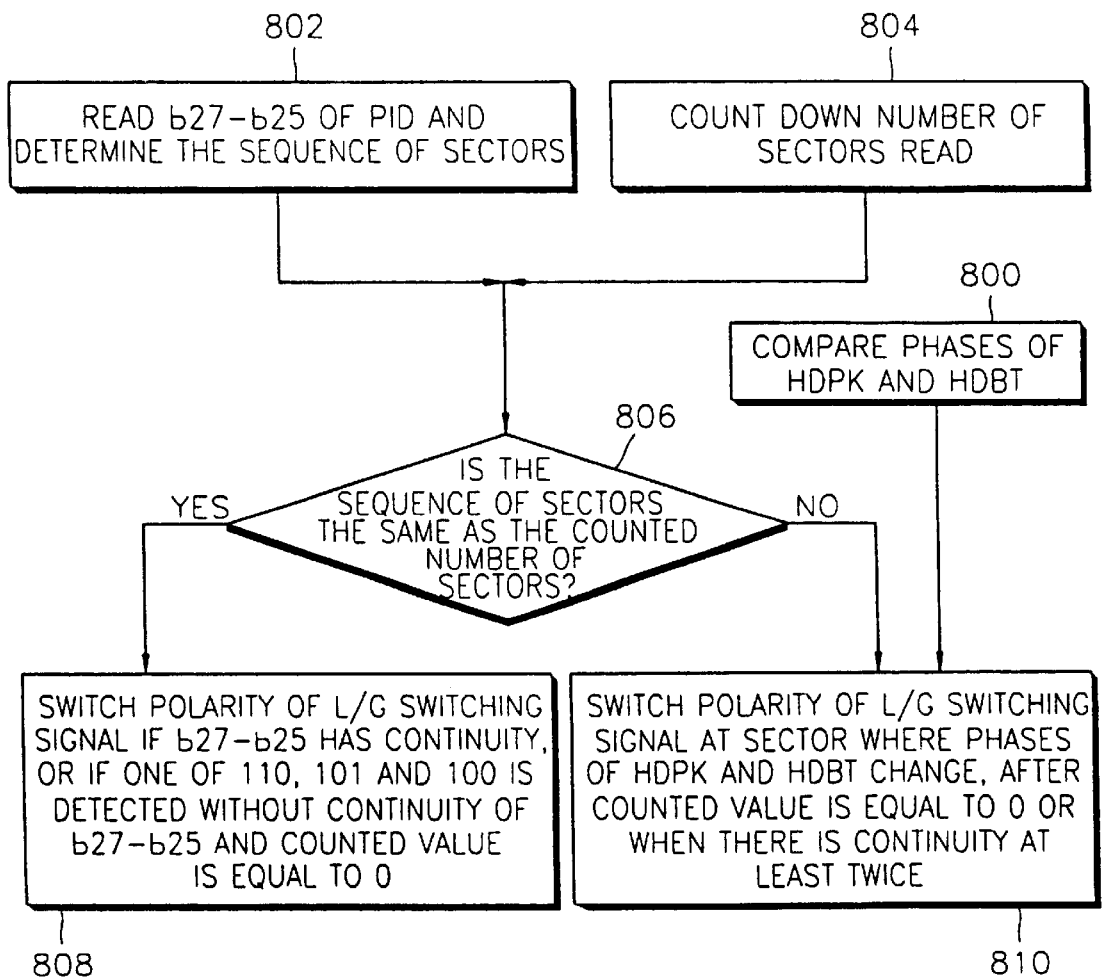
FIG. 4 is a flowchart illustrating a method for generating a land/groove switching signal according to an embodiment of the present invention.

Referring to FIG. 4, a method for generating a land/groove switching signal according to an embodiment of the present invention will be described.

In step 800, phases of a peak header signal HDPK and a bottom header signal HDBT are compared with each other to determine a LAND/GROOVE switching point.

In step 802, the location of a sector to which a track is to be switched is determined with reference to the physical identification data (PID). In detail, b27–b25 of the PID are read to check for the second to last sector, the last sector at the end of the track and the first sector of the next track. Here, b27–b25 are read only from the PID without error.

Figure 5:
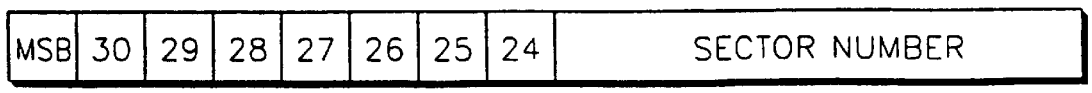
FIG. 5 shows the arrangement of the physical identification data (PID) on a disc.
Figure 6:
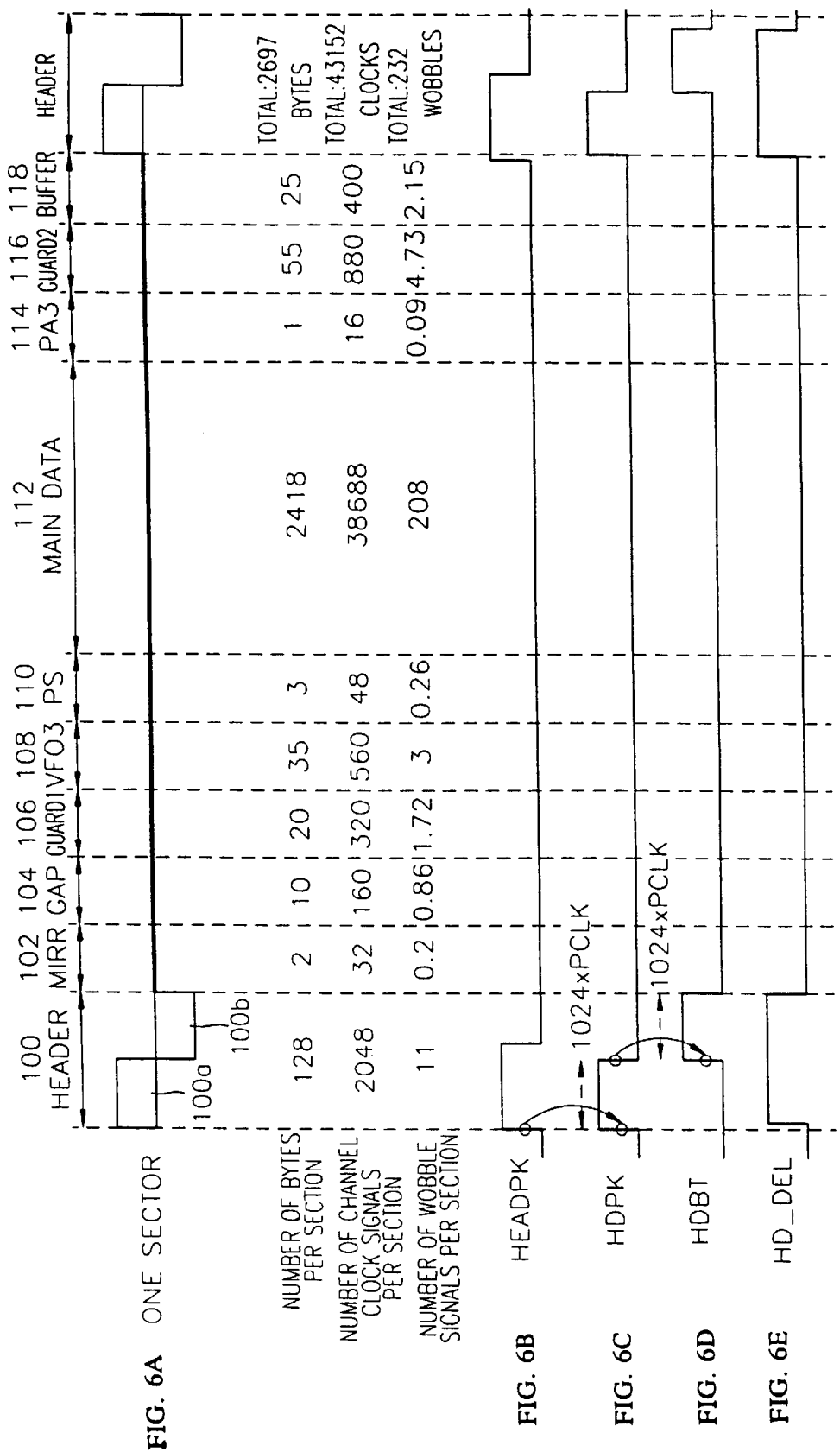
FIGS. 6A–6E show the relationship between disc sectors and a wobble signal.

FIG. 5 shows the arrangement of the physical address information of the disc.

The physical address of the disk, as shown in FIG. 5, includes 4 bytes and the three bits b27–b25 located after the most significant bit (MSB) have the following meanings.

000–111→reserved
110→the second to last recordable sector of the track
101→the last recordable sector of the track
100→the first recordable sector of the next track
111→other recordable sectors of the track That is, assuming that the three bits b27–b25 change to 110, 101 and 100 in sequence while a pickup scans the track, it is understood that the inter-track switching point is between 101 and 100.

In step 804, the number of sectors read from the track are counted based on a wobble signal in order to determine the inter-track switching point. The total number of sectors per track is loaded from the first sector of the track and the last sector is found by counting down from the total number of sectors. Here, in order to guarantee a precise countdown operation, a wobble header signal is generated based on the wobble signal and the number of wobble header signal cycles are counted. Wobble header signal cycles are generated once per sector, thus, the last sector of the track can be found by counting down from the total number of sectors in response to the wobble header signal cycles. Accordingly, the inter-track switching point can be determined.

FIGS. 6A–6E show the relationship between sectors and the wobble signal.

The sector roughly includes a header region 100 and a main data region 112. The sector has 2,687 bytes: 128 bytes for the header region 100 and 2,418 bytes for the main data region 112. Also, the header region 100 includes a peak header region 100a and a bottom header region 100b.

Further, a mirror region (MIRR) 102, a gap region (GAP) 104, a first guard region (GUARDL) 106, a VFO region (VFO) 108 and a PS region (PS) 110 are located between the header region 100 and the main data region 112 and a PA3 region (PA3) 114, a second guard region (GUARD2) 116 and a buffer region (BUFFER) 118 are located between the main data region 112 and the header region of the next track. The mirror region 102, the gap region 104, the first and second guard regions 106 and 116 and the buffer region 118 are for guaranteeing that data is recorded in the correct position. The VFO region 108 is for rapidly supplying a channel clock signal PCLK required for reproducing the PID and data.

There are 16 channel clock signals PCLKs allocated per byte, such that there are allocated 2048 PCLKs to the header region 100, 32 PCLKs to the mirror region 102, 160 PCLKs to the gap region 104, 320 PCLKs to the first guard region 106, 560 PCLKs to the VFO region 108, 48 PCLKs to the PS region 110, 38688 PCLKs to the main data region 112, 16 PCLKs to the PA3 region 114, 880 PCLKs to the second guard region 116 and 400 PCLKs to the buffer region 118. Also, 1024 PCLKs are allocated to the peak header region 100a and the bottom header region 100b, respectively.

Further, the number of wobble signals allocated to each region is as follows. 11 to the header region 100, 0.2 to the mirror region 102, 0.86 to the gap region 104, 1.72 to the first guard region 106, 3 to the VFO region 108, 0.26 to the PS region 110, 208 to the main data region 112, 0.09 to the PA3 region 114, 4.73 to the second guard region 116 and 2.15 to the buffer region 118. Also, 5.5 wobble signals are allocated to both the peak header region 100a and the bottom header region 100b.

The number of the wobble signals is counted from the inter-track switching point using the above relationship between the sectors and the wobble signal to generate wobble headers indicating each sector. Also, the number of sectors read can be counted by counting the wobble headers. That is, the inter-track switching point can be determined by counting down the total number of sectors to find the last sector.

In step 806, each sector of the sequence of sectors determined in step 802 and the corresponding counted down value of each sector obtained in step 804 are respectively compared. If the result of step 802 matches the result of step 804, step 808 is performed. Otherwise, step 810 is performed.

Table 1 shows the relationship between the sector sequence and the counting result in step 804.

TABLE 1

| sector <bit values (b27–b25)> | counted down value |
| --- | --- |
| the second to last sector <110> | 1 |
| the last sector <101> | 0 |
| the first sector of the next track <100> | N |

As shown in Table 1, the counted values are 1 in the second to last sector (110 in Table 1) from the end of a track, 0 in the last sector (101 in Table 1) of the track and N in the first sector (100 in Table 1) of the next track. Here, N represents the number of sectors within the track, which is contained in the first sector thereof. When a multi-zone method is adopted, the number of sectors per track may be different in each zone.

In step 808, it is determined whether the sector has continuity. That is, it is determined whether the three bits b27–b25 maintain continuity from 110 to 100. If the three bits have continuity, the polarity of the LAND/GROOVE switching signal is switched at the sector 100. In this case, header information is correctly reproduced from all the sectors of the track.

Even if the three bits b27–b25 have no continuity, the polarity of the LAND/GROOVE switching signal is switched at the sector 100 if the three bits b27–b25 are detected as one of 110, 101 and 100 and the counted down value is equal to 0. In this case, the inter-track switching point can be correctly determined by counting the wobble header signal even if the header information of some sectors near the track switching point is not reproduced due to defects in the disc.

In step 810, it is determined whether the three bits b27–b25 have at least two continuities when the sequence of sectors, determined in the step 802, does not match the result of step 804. Here, at least two continuities means the three bits b27–b25 have the following sequence of values: 110→101→100, 101→100 and 110→101. If the bits b27–b25 have continuity at least twice, the polarity of the LAND/GROOVE switching signal is switched at the sector 100 regardless of the counted result. In this case, all the sectors near the inter-track switching point are correctly reproduced even though the inter-track switching point is incorrectly determined by a wobble signal.

When the three bits b27–b25 have no continuity, the polarity of the LAND/GROOVE switching signal is switched at a point where the phases of HDPK and HDBT switch, with reference to the result of step 800. In this case, the LAND/GROOVE switching signal is generated according to the phase relationship between HDPK and HDBT, which is the same as the conventional method for generating a LAND/GROOVE switching signal.

According to the method illustrated in FIG. 4, the inter-track switching point is correctly found by counting the sectors based on the PID and the wobble signal to generate a LAND/GROOVE switching signal and the tracking control can be reliably performed based on the above further consideration of the phase relationship of the header information.

Figure 7:
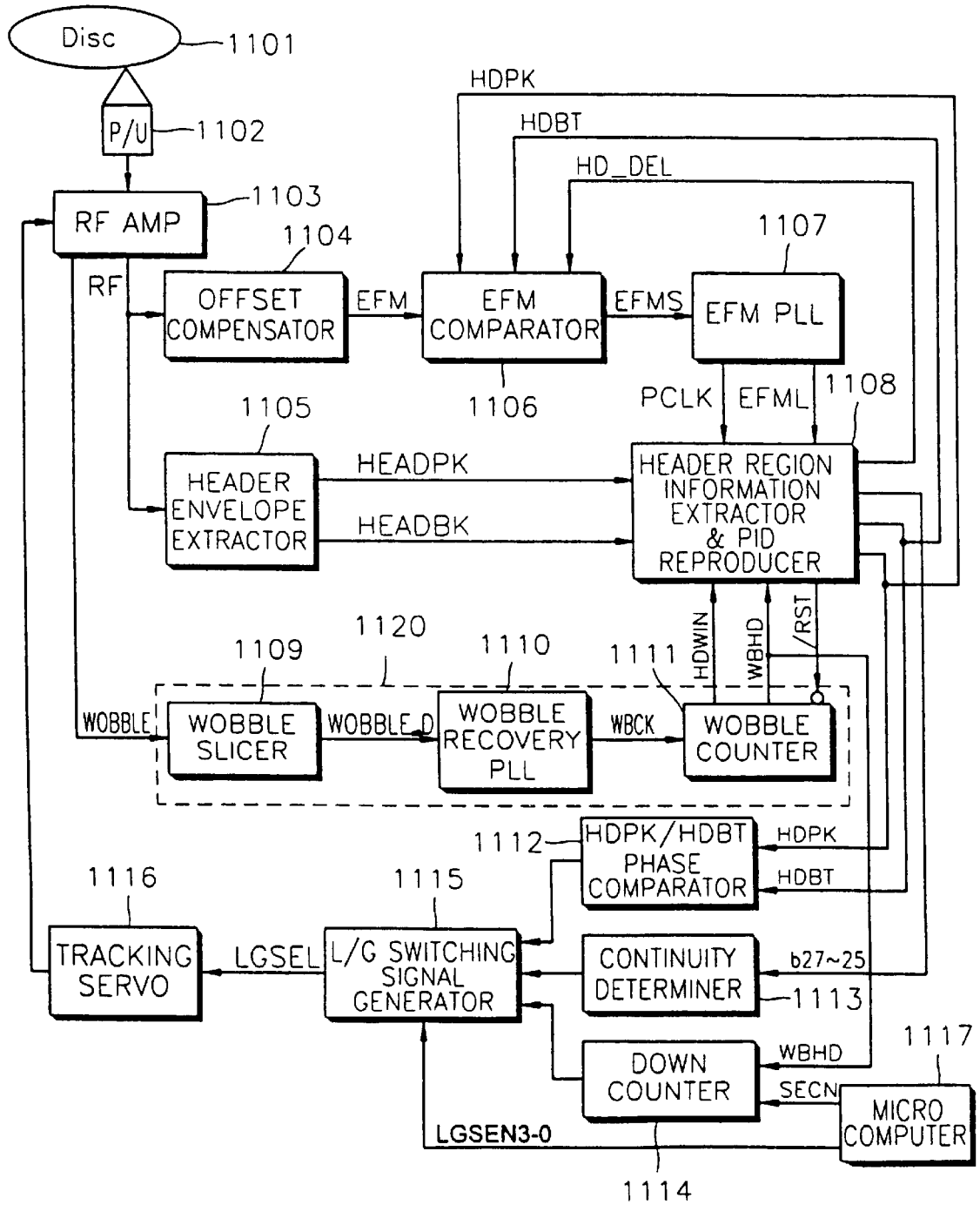
FIG. 7 is a block diagram of a tracking polarity protection apparatus according to the embodiment of the present invention.

FIG. 7 is a block diagram of a tracking polarity protection apparatus for generating a LAND/GROOVE switching signal according to the embodiment of the present invention.

The tracking polarity protection apparatus of FIG. 7 includes a pickup P/U 1102, a radio frequency amplifier (RF AMP) 1103, an offset compensator 1104, an eight-to-fourteen modulation (EFM) comparator 1106, an EFM phase-locked loop (PLL) 1107, a header envelope extractor 1105, a header region information extractor & PID reproducer 1108, a header window signal generator 1120, a phase comparator 1112, a continuity determiner 1113, a down counter 1114, a LAND/GROOVE (L/G) switching signal generator 1115 and a tracking servo 1116.

Offset is removed from an RF signal output via the disc 1101, the pickup 1102 and the RF AMP 1103 by the offset compensator 1104.

Figure 2:
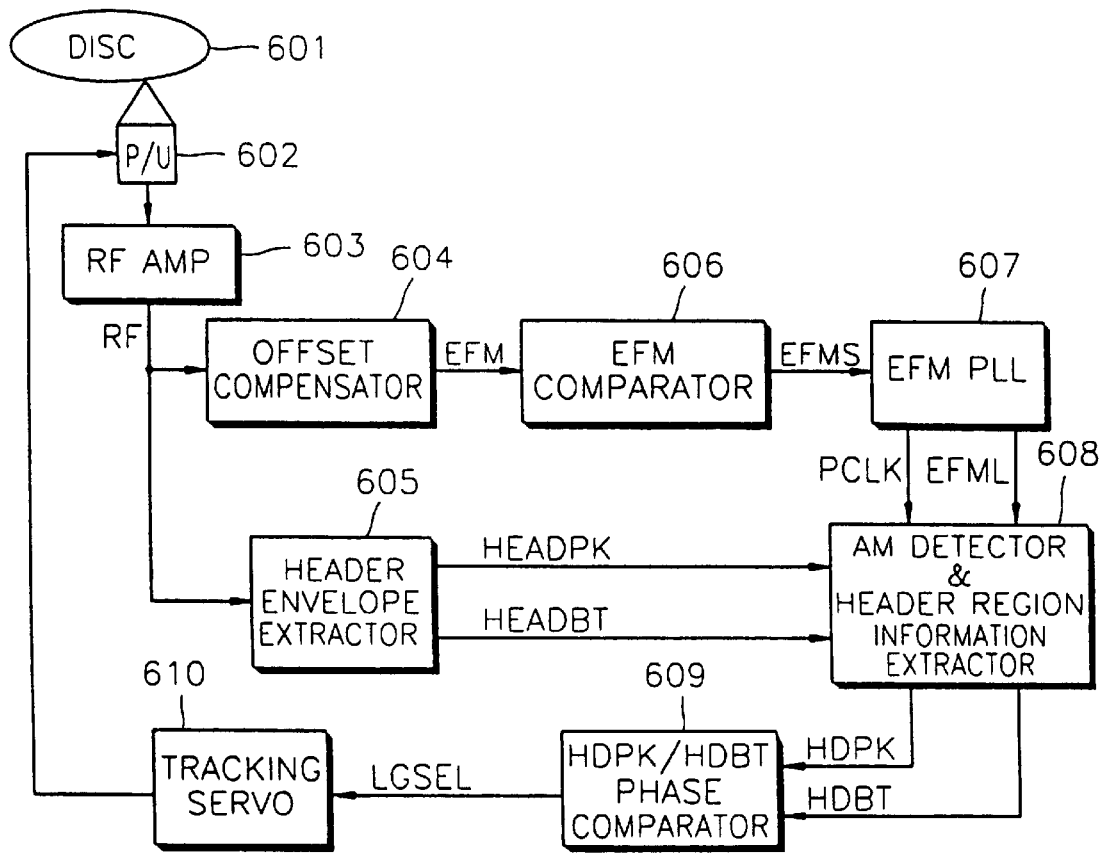
FIG. 2 is a block diagram of a conventional land/groove switching signal generating apparatus.
Figure 3:
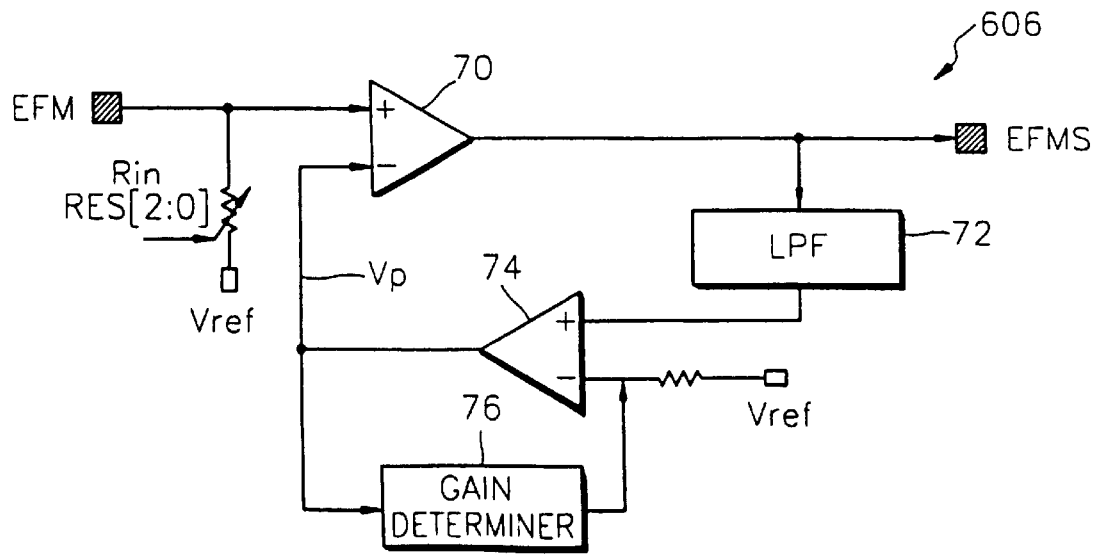
FIG. 3 is a detailed block diagram of the conventional eight-to-fourteen modulation (EFM) comparator shown in FIG. 2.

In the conventional L/G switching signal generator shown in FIG. 2, the EFM comparator 606 for binary conversion receives the feedback digitized signal EFMS, regardless of whether the signal is from the header information region or the user data region, to remove the offset of the input signal EFM. However, in the L/G switching signal generator according to the present invention shown in FIG. 7, the EFM comparator 1106 corrects the offset differently with respect to the peak region and the bottom region of the header according to the signals HDPK and HDBT output from the header region information extractor & PID reproducer 1108. This is done to correct the error illustrated by FIGS. 8A through 8G, which occurs when the offset is not completely removed from the peak and bottom regions of the header.

FIGS. 8A through 8F are waveforms showing the relationship between the RF signal, the EFM signal and header region signals respectively.

Figure 8A:
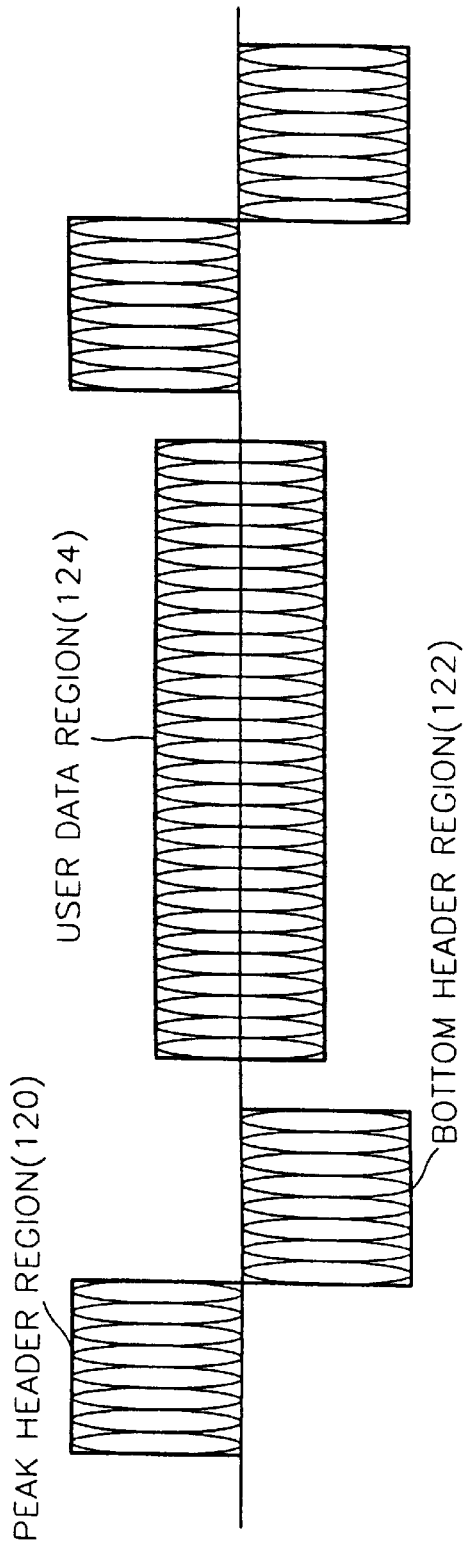

As shown in FIG. 8A, the RF signal is roughly divided into a peak header region 120, a bottom header region 122 and a user data region 124. The peak-to-peak value of the peak header region 120 is similar to that of the user data region 124 and the envelope thereof is higher than that of the user data region 124. Also, the peak-to-peak value of the bottom header region 122 is similar to that of the user data region 124 and the envelope thereof is lower than that of the user data region 124.

Figure 8B:
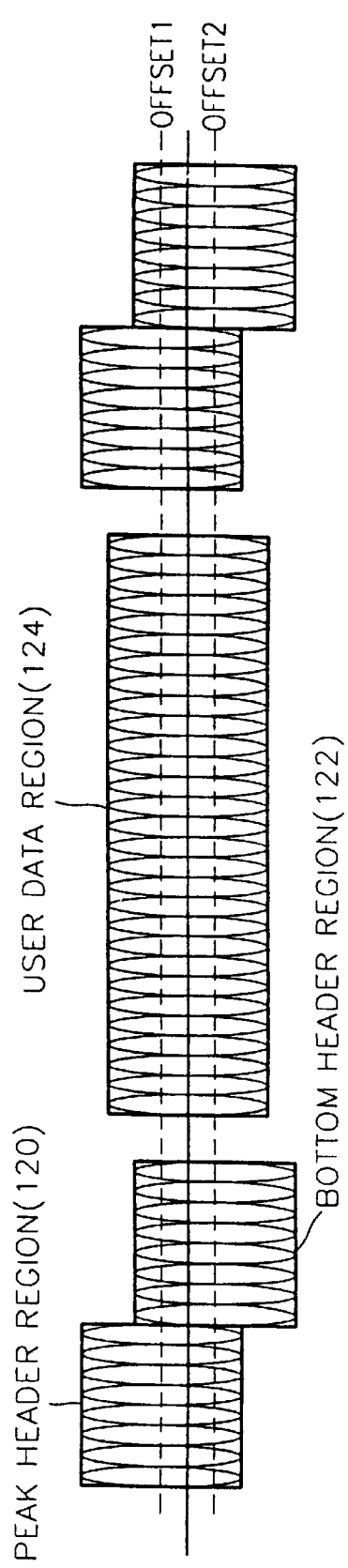

FIG. 8B shows the waveforms after the RF signal of FIG. 8A passes through the offset compensator 1104.

Referring to FIG. 8B, it is difficult to discriminate between the peak header region 120 and the bottom header region 122, compared to those of FIG. 8A. This is because the offset compensator 1104 removes the offset regardless of the header regions 120 and 122 and the user data region 124.

The EFM comparator 1106 compensates for the peak header region 120 with a first offset OFFSET1 to raise the envelope and for the bottom header region 122 with a second offset OFFSET2 to lower the envelope.

Also, FIGS. 8C–8F show signals HEADPK and HEADBT extracted from the header envelope extractor 1105 and signals HDPK and HDBT extracted from the header region information extractor & PID reproducer 1108.

Figure 9:
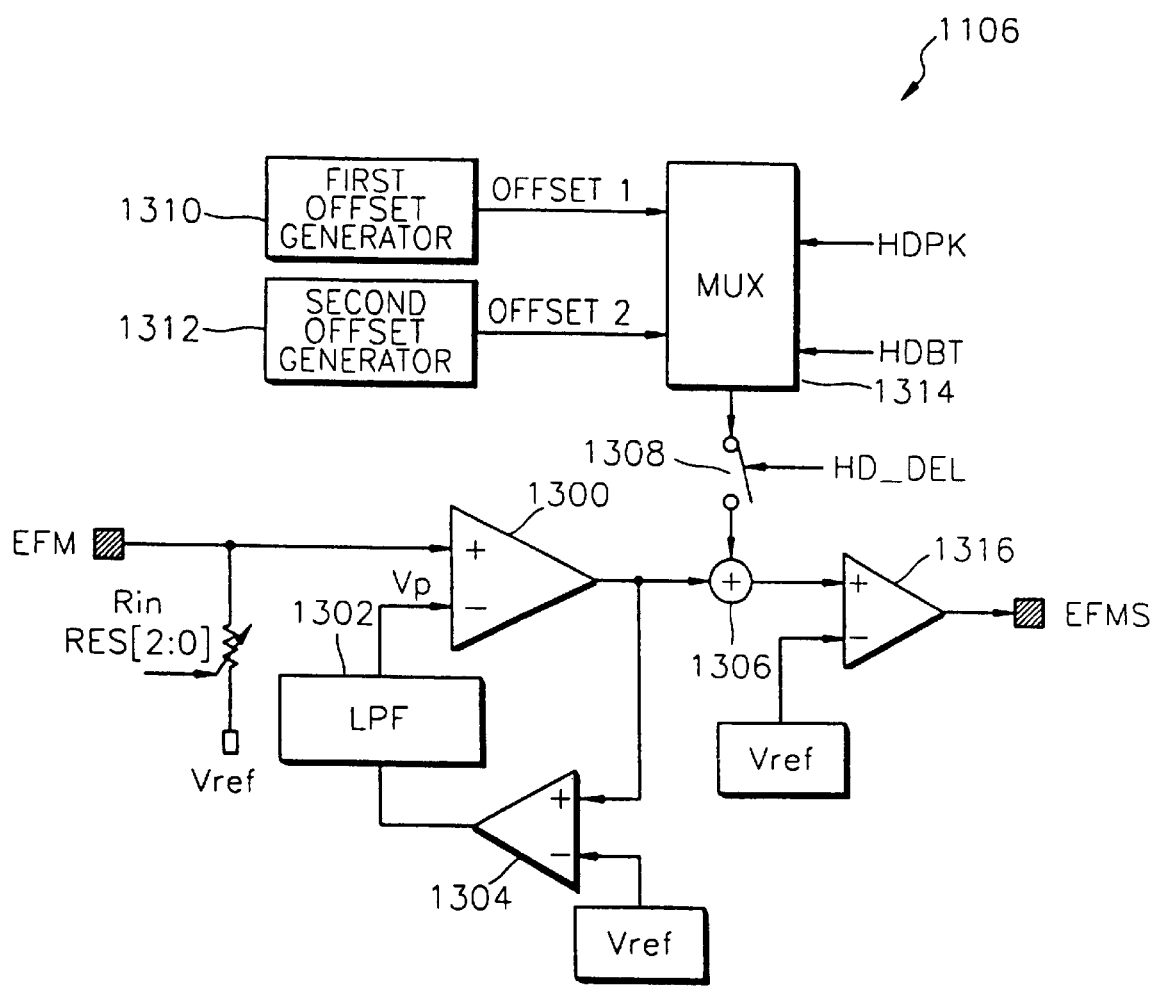
FIG. 9 is a detailed block diagram of the EFM comparator shown in FIG. 7.

FIG. 9 is a detailed block diagram of the EFM comparator 1106 shown in FIG. 7.

The EFM comparator 1106 of FIG. 9 includes a differential amplifier 1300, a low-pass filter (LPF) 1302, a first comparator 1304, an adder 1306, a switch 1308, first and second offset generators 1310 and 1312, a multiplexer (MUX) 1314 and a second comparator 1316.

The differential amplifier 1300 amplifies the difference between the EFM signal provided from the offset compensator 1104 (see FIG. 7) and the slice level (Vp) (see FIG. 9), which is determined based on the feedback signal via the differential amplifier 1300, the first comparator 1304 and the LPF 1302 and outputs the amplified result.

The first comparator 1304 compares the output of the differential amplifier 1300 with a predetermined reference voltage Vref and provides the LPF 1302 with the output digitized according to the result of the comparison. For example, when the output of the differential amplifier 1300 is equal to or greater than the reference voltage Vref, the first comparator 1304 outputs a logic "1" value. Otherwise, the first comparator 1304 outputs a logic "0" value. The LPF 1302 low-pass filters the output of the first comparator 1304 to obtain the average level thereof and provides the result to the differential amplifier 1300. Here, the filtering characteristics of the LPF 1302 depend on the speed of a multiple speed DVD-RAM. This is because the amplitude and frequency of the EFM signal vary according to the reproduction speed of the disc 1101.

The first and second offset generators 1310 and 1312 generate the first and second offsets OFFSET1 and OFFSET2. Here, OFFSET1 is the offset value for removing the offset of the signal of the peak header region and OFFSET2 is the offset value for compensating for the signal of the bottom header region as shown in FIG. 8B. These offset values correspond to the difference between the center value of the EFM signal in the data region and the center values of the EFM signal in the peak and bottom header regions, which are determined according to the DVD standard.

The MUX 1314 selects OFFSET1 or OFFSET2 according to the signals HDPK and HDBT output from the header region information extractor & PID reproducer 1108. That is, OFFSET1 is selected in the section where the HDPK is activated while OFFSET2 is selected in the section where the HDBT is activated.

The adder 1306 adds OFFSET1 or OFFSET2 provided by the MUX 1314 to the EFM signal output from the differential amplifier 1300 and outputs the result.

The second comparator 1316 compares the EFM signal output from the adder 1306, from which the offset has been removed, with a predetermined reference level Vref and outputs the binary converted EFM signal EFMS.

The switch 1308 is controlled by a signal HD_DEL output from the header region information extractor & PID reproducer 1108 and connects the output of the MUX 1314 in the header region to the adder 1306.

Referring to FIG. 7, the EFM PLL 1107 outputs a clock signal PCLK, whose phase is locked by the binary converted signal EFMS output from the EFM comparator 1106, to the header region information extractor & PID reproducer 1108.

Also, the header envelope detector 1105 extracts the envelope (HEADPK and HEADBT) of the header from the RF signal and outputs the extracted envelope to the header region information extractor & PID reproducer 1108. The header envelope extractor 1105 generates a header region signal representing the region in which the header information exists based on the envelope of the RF signal. The header region signal includes HEADPK, which is the signal of the peak header region, and HEADBT, which is the signal of the bottom header region. Here, the peak header region signal has a peak value higher than the average peak value of the RF signal and the bottom header region signal has a peak value lower than the average peak value of the RF signal. The signals HEADPK and HEADBT are generated based on the above.

The header window signal generator 1120, which includes a wobble slicer 1109, a wobble recovery PLL 1110 and a wobble counter generates a header window signal indicating the effective region of header information based on wobble signals of the RF signal.

The wobble slicer 1109 receives the wobble signal generated from the RF AMP 1103 to generate a binary converted wobble signal WOBBLE_D. When the pickup 1102 reads the data recorded on the tracks of the disc 1101, a low frequency signal corresponding to the frequency of the wobbles formed on the track is contained in the RF signal. Thus, the wobble signal is obtained by low-pass filtering the RF signal using the RF AMP 1103. Also, an extra wobble signal reproducing device for recovering only the wobble signal from the RF signal may be installed.

Figure 10:
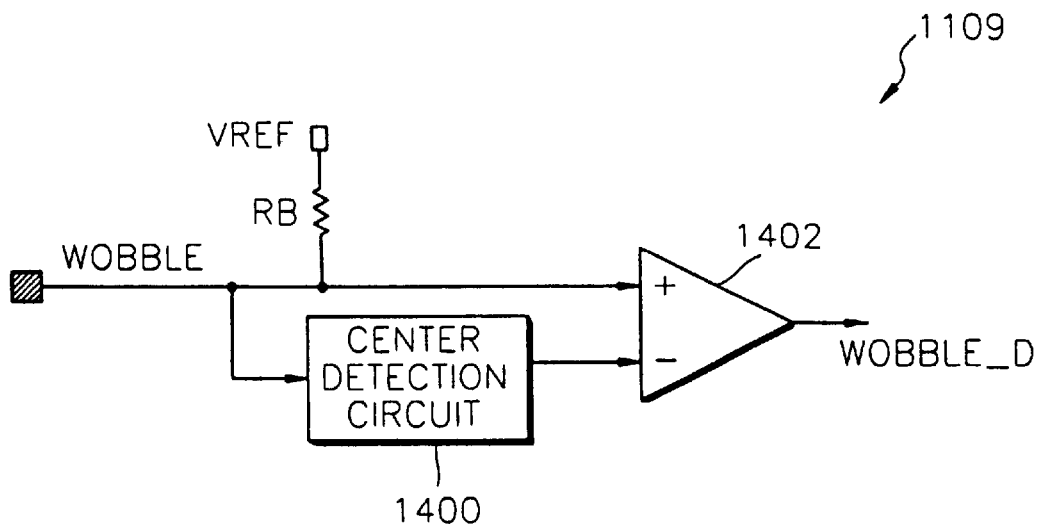
FIG. 10 is a detailed block diagram of the wobble slicer shown in FIG. 7.

FIG. 10 is a detailed block diagram of the wobble slicer 1109 shown in FIG. 7.

The wobble slicer 1109 of FIG. 10 includes a center detection circuit 1400 and a comparator 1402.

The center detection circuit 1400 detects the center value of the wobble signal WOBBLE output from the RF AMP 1103 and provides the detected value as a slice level to the comparator 1402. The comparator 1402 compares the wobble signal WOBBLE output from the RF AMP 1103 with the slice level to generate the binary converted wobble signal WOBBLE_D.

The wobble recovery PLL 1110 generates a wobble clock signal WBCK phase-locked by the binary converted wobble signal WOBBLE_D. The wobble clock signal WBCK has a frequency of 0.15677 MHz obtained by dividing the DVD channel clock signal frequency of 29.16 MHz by 186.

Figure 11:
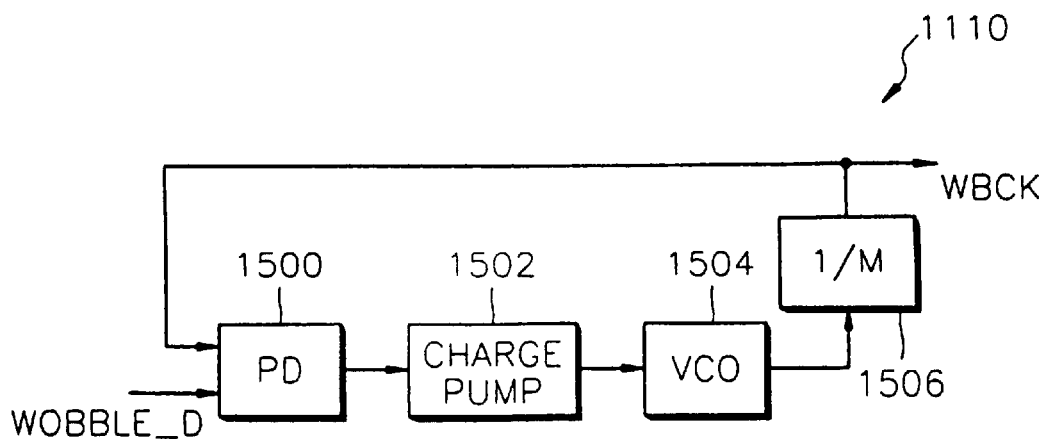
FIG. 11 is a detailed block diagram of the wobble recovery phase-locked-loop (PLL) shown in FIG. 7.

As shown in FIG. 11, the wobble recovery PLL 1110 includes a phase difference detector (PD) 1500, a charge pump 1502, a voltage controlled oscillator (VCO) 1504 and a divider (1/M) 1506. The operation of the wobble recovery PLL 1110 is similar to a general PLL, thus an explanation thereof will be omitted.

The wobble counter 1111 counts the wobble clock signal WBCK cycles generated by the wobble recovery PLL 1110 to generate a wobble header signal WBHD and a header window signal HDWIN, corresponding to the number of wobble signal cycles, i.e., that is, 232 wobble signal cycles exist between each header, i.e., in a sector, as shown in FIGS. 13A–13D. For example, the header window signal HDWIN shown in FIG. 13D is generated when the counted value of the wobble counter 1111 ranges from 231 to 11 and the wobble header signal WBHD shown in FIG. 13C is generated when the counted value of the wobble counter 1111 ranges from 0 to 11. Here, the wobble header signal WBHD is a reference signal for generating the header window signal HDWIN.

Referring to FIG. 7, the wobble counter 1111 is reset by a signal /RST, output from the header region information extractor & PID reproducer 1108 at the rising edge of the header region signal HD_DEL to synchronize the counted number of wobble signal cycles with the actual header.

The header region information extractor & PID reproducer 1108 checks the signals HEADPK and HEADBT extracted by and output from the header envelope extractor 1105 using the wobble header signal WBHD and the header window signal HDWIN output from the wobble counter 1111 and generates corrected signals HDPK and HDBT according to the result. That is, the header region information is protected by removing incorrect peak header region signals and bottom header region signals which occur due to defects of the disc 1101, as shown in FIGS. 12A–12I.

The operation of the header region information extractor & PID reproducer 1108 will now be described in detail with reference to FIGS. 12A–12I.

The waveform shown in FIG. 12A is the RF signal including header information. The hatched portions of the waveform show the state where the header information is incorrectly reproduced due to a tracking error.

In FIGS. 12B and 12C, which show waveforms HEADPK and HEADBT, there are several incorrect signals.

The waveform shown in FIG. 12D is the header window signal HDWIN.

The waveforms shown in FIGS. 12E and 12F are the signals HDPK and HDBT, respectively indicating the corrected peak and bottom header regions generated through checking done by the header window signal HDWIN. As shown in FIGS. 12E and 12F, several incorrect portions of the signals HEADPK and HEADBT, shown in the FIGS. 12B and 12C, are removed.

The waveform shown in FIG. 12G is the header region signal HD_DEL, which is obtained by OR-operating the signals HDPK and HDBT. The header region signal HD_DEL is the same as the header information region signal including the peak and bottom header region signals.

The waveform shown in FIG. 12H is the wobble header signal WBHD. The waveform shown in FIG. 12I is a new header window signal HDWIN generated based on the signals WBCK and WBHD, which is the same as the waveform shown in FIG. 12D. Here, the waveform shown in FIG. 12I is illustrated to explain the relationship between the signals HDWIN and HD_DEL.

The header region information extractor & PID reproducer 1108 removes incorrect portions of the signals HEADPK and HEADBT, which are caused by defects of the disc, to generate signals HDPK and HDBT, which indicate the corrected peak and bottom header region signals, thereby protecting the header region information. Accordingly, the system can be stably controlled.

Referring to FIG. 7, the signals HDPK and HDBT output from the header region information extractor & PID reproducer 1108 are input to the phase comparator 1112. The phase comparator 1112 outputs a first determination signal, which indicates switching of the L/G switching signal according to the phase change of the two signals, to the L/G switching signal generator 1115. The first determination signal indicates that the track is a groove when the phase of the signal HDPK leads that of the signal HDBT and the track is a land in the case where the phase of the signal HDBT leads that of the signal HDPK.

Further, the header region information extractor & PID reproducer 1108 reproduces the PID from the signal EFML using the signals HEADPK, HEADBK and PCLK. The PID includes of 4 bytes and is recorded in the header region. The PID reproduced by the header region information extractor & PID reproducer 1108 is input to the continuity determiner 1113.

The continuity determiner 1113 determines whether the sectors have continuity with reference to the PID to output a second determination signal. In detail, the second determination signal is output using the three bits b27–b25 of the PID, which indicates whether the second to last sector and the last sector of a track and the first sector of the next track exist and the sectors have continuity. Also, the second determination signal indicates whether those sectors are completely or partially continuous, or whether those sectors have no continuity at all.

The number of sectors existing within a track is constant. In the multi-zone method, the number of sectors per track is constant in every zone. Thus, by counting the number of sectors reproduced while a pickup traces the track, the inter-track switching point can be determined. The wobble header signal WBHD output from the wobble counter 1111 is generated in every sector so that the track switching point can be determined by counting the number of wobble headers in the wobble header signal WBHD.

The wobble header signal WBHD generated by the wobble counter 1111 is output to the down counter 1114. The down counter 1114 counts the number of wobble headers in WBHD and outputs a third determination signal indicating switching of the L/G switching signal according to the counted value. Here, the third determination signal is output to indicate the inter-track switching point when the counted value is equal to 0.

Whenever the zone of the disc shifts, a microcomputer 1117 sets the number of sectors SECN per track. The down counter 1114 preloads the SECN set by the microcomputer 1117, whenever the pickup is moved from one track to another and subtracts a value of one from SECN, whenever the wobble header signal WBHD is generated.

The L/G switching signal generator 1115 generates an L/G switching signal with reference to the signals output from the phase comparator 1112, the continuity determiner 1113 and the down counter 1114 and enable signals LGSEN3–0 output from the microcomputer 1117.

When the sectors are continuous having all 110, 101 and 100 of the three bits b27–b25, the counted down value of the down counter 1114 is 0 and the enable signal LGSEN3 is enabled. The L/G switching signal generator 1115 then generates an L/G switching signal capable of switching the polarity of the L/G switching signal in the sector where the three bits b27–b25 are 100.

When 110, 101 or 100 of the three bits b27–b25 is detected even though there is no continuity of the sectors, the counted value of the down counter 1114 is 0 and the enable signal LGSEN2 is enabled. The L/G switching signal generator 1115 then generates the L/G switching signal in the sector where the three bits b27–b25 are 100.

When the sectors are partially continuous even though the counted value of the down counter 1114 is not 0 and the enable signal LGSEN1 is enabled, the L/G switching signal generator 1115 generates the L/G switching signal in the sector where the three bits b27–b25 are 100 or in the sector which is assumed to have three bits b27–b25 of 100.

Here, the partial continuity of the sectors refers to the continuity of two or more sectors, e.g., the three bits b25–b27 having the following values: 110→101→100, 101→100, or 110→101.

When the sectors are not continuous at all and the counted value of the down counter 1114 is 0, the L/G switching signal generator 1115 utilizes the result of the phase comparator 1112. That is, when the phases of the signals HDPK and HDBT change and the enable signal LGSEN0 is enabled, the L/G switching signal generator 1115 generates the L/G switching signal capable of switching the polarity of the L/G switching signal.

The tracking servo 1116 performs tracking control while switching the tracking polarity according to the state of the L/G switching signal.

FIGS. 14A–14F show signals illustrating the operation of the L/G switching signal generator shown in FIG. 7.

As shown in FIGS. 14A–14F, the microcomputer 1117 sets the number of sectors SECN per zone at the starting point A of the sector immediately before the zone boundary and the polarity of the L/G switching signal is switched at a sector B where the bit values of the three bits b27–b25 of the PID are the same as the counted down value.

Further, in a sector C where the three bits b25–27 of 110, 101 or 100 are detected even though there is no continuity of the sectors and the counted value of the down counter 1114 is 0 and the polarity of the L/G switching signal is switched.

FIGS. 15A–15F show other signals which illustrate the operation of the L/G switching signal generator shown in FIG. 7.

As shown in FIGS. 15A–15F, the microcomputer 1117 sets the number of sectors SECN per zone at the starting point A of the sector immediately before the zone boundary and the polarity of the L/G switching signal is switched at a point D in the next sector of the track where the b27–b25 of the PID is 100 when two or more sectors are continuous, i.e., the sectors are partially continuous.

Also, when a L/G switching point is not found until the signal WBHD is generated 80 or more times due to the absence of the sector where the bit value is the same as the counted value, the polarity of the L/G switching signal is switched at a sector E where phases of the signals HDPK and HDBT are changed.

The tracking servo 1116 performs the tracking control while switching the tracking polarity according to the state of the L/G switching signal.

While the present invention has been illustrated and described with reference to specific embodiments, further modifications and alterations within the spirit and scope of this invention as defined by the appended claims will occur to those skilled in the art. For example, the continuity of the PID can be determined based on three sectors. However, the number of sectors is not limited to three. That is, a plurality of at least three sectors including the last sector of a track and the first sector of the next track may be used to determine the continuity of the PID.

As described above, in the method for generating a L/G switching signal and the apparatus therefor according to the present invention, the L/G switching point is accurately determined by the continuity of the PID and the counting of the number of wobble headers so that precise tracking control can be achieved.

What is claimed is:

1. A method for generating a land/groove switching signal from pits on a land/groove type disc having tracks with wobbles, in which header information is recorded in sectors of each track, the header information including physical identification data and a peak header and a bottom header distinguished by envelopes of a peak header signal and a bottom header signal, both the peak and bottom header signals having phases corresponding to lands or grooves, comprising the steps of:

(a) comparing the phases of the peak header signal and the bottom header signal to determine a track switching point;

(b) determining a sequence of sectors using the physical identification data of the disc;

(c) counting a number of sectors included in each track based on a number of wobble signal cycles reproduced from the disc to determine the track switching point; and (d) generating a land/groove switching signal according to the comparison in the step (a), the sequence of sectors determined in the step (b) and the number of sectors counted in the step (c).

2. The method of claim 1, wherein the step (d), in order of priority, the results of the step (b), (c) and (a) are used to determine the track switching point.

3. The method of claim 2, wherein the step (d) comprises generating the land/groove switching signal at a first sector of a next track in response to a determination that a plurality of sectors including at least a last sector of a current track and the first sector of the next track are consecutive in the step (b) and each sector of the sequence of the plurality of sectors determined in the step (b) matches the corresponding counted value of each sector obtained in the step (c).

4. The method of claim 3, wherein the step (d) comprises generating the land/groove switching signal at the first sector of the next track in response to a determination that a second to last sector of the current track, the last sector of the current track and the first sector of the next track are consecutive in the step (b) and three of the sectors determined in the step (b) match the corresponding counted value of the three sectors obtained in the step (c).

5. The method of claim 2, wherein the step (d) comprises generating the land/groove switching signal at a first sector of a next track in response to a determination that a plurality of sectors including at least a last sector of a current track and the first sector of the next track are consecutive in the step (b) and one sector among the plurality of sectors matches the corresponding counted value of the sector obtained in the step (c).

6. The method of claim 2, wherein the step (d) comprises generating the land/groove switching signal at a first sector of a next track in response to a determination that a plurality of sectors including at least a last sector of a current track and the first sector of the next track are consecutive in the step (b) and each sector of the sequence of the plurality of sectors determined in the step (b) do not match the corresponding counted value of each sector obtained in the step (c).

7. The method of claim 2, wherein the step (d) comprises generating the land/groove switching signal at a sector where the phases of the peak header signal and the bottom header signal are changed, using the result of the step (a) after the step (b) in response to a determination that a plurality of sectors including at least a last sector of a current track and a first sector of a next track are not consecutive in the step (b) and each sector of the sequence of the plurality of sectors determined in the step (b) do not match the corresponding counted value of each sector obtained in the step (c).

8. An apparatus to generate a land/groove switching signal from pits on a land/groove type disc having lands and grooves, in which data is recorded in a sector having a header information region and a data region which are distinguished by envelopes of a recorded data signal, the apparatus comprising:

a header envelope extractor to extract a header region signal including a peak header signal indicating a peak header region and a bottom header signal indicating a bottom header region from a radio frequency signal extracted from the disc;

a header window signal generator to generate a header window signal indicating an effective region of the header information based on wobble signals of the radio frequency signal;

a header region information extractor and physical identification data reproducer to determine the effective header region signal using the header window signal to reproduce the effective header region signal and physical identification data;

a phase comparator to compare phases of the peak header signal and the bottom header signal of the effective header region signal to generate a first determination signal;

a continuity determiner to determine whether the physical identification data has continuity to generate a second determination signal;

a down counter to count the header window signal cycles to generate a third determination signal; and a land/groove switching signal generator to generate a land/groove switching signal according to the first through third determination signals.

9. The apparatus of claim 8, wherein the header window signal generator comprises:

a wobble slicer to receive wobble signals of the radio frequency signal and to convert the wobble signals to binary;

a wobble recovery phase-locked loop to generate a wobble clock signal phase-locked by the converted binary wobble signal generated by the wobble slicer; and a wobble counter to count the wobble clock signals generated by the wobble recovery phase-locked loop and to generate the header window signal indicating the effective region of the header information based on the counted wobble clock signals.

10. The apparatus of claim 8, further comprising:

an eight-to-fourteen modulation comparator to convert the radio frequency signal to binary; and an eight-to-fourteen modulation phase-locked loop to generate a channel clock signal phase-locked by the converted eight-to-fourteen modulation signal output from the eight-to-fourteen modulation comparator, wherein the header region information extractor and physical identification data reproducer generates a header region signal phase-locked by the channel clock signal output from the eight-to-fourteen modulation phase-locked loop.

11. The apparatus of claim 10, wherein the eight-to-fourteen modulation comparator comprises:

a differential amplifier to amplify a difference between the radio frequency signal and a feedback signal;

a first comparator to compare an output of the differential amplifier and a predetermined reference value to output a comparison signal;

a low-pass filter to low-pass filter the comparison signal output from the first comparator to provide the differential amplifier with the feedback signal; and a second comparator to compare the output of the differential amplifier with the predetermined reference value to output a binary signal.

12. The apparatus of claim 11, wherein filtering characteristics of the low-pass filter depend on a reproduction speed of the disc.

13. The apparatus of claim 11, further comprising:

an offset generator to generate an offset value of the header information; and an adder to add the offset value to the output of the differential amplifier and to output a result to the second comparator.

14. The apparatus of claim 13, wherein the offset generator comprises:

a first offset generator to generate a first offset value for the peak header; and a second offset generator to generate a second offset value for the bottom header, wherein the apparatus further comprises a multiplexer to select the first offset value generated by the first offset generator in the peak header region and the second offset value generated by the second offset generator in the bottom header region to output the selected offset value to the adder.

15. The apparatus of claim 13, further comprising a switch to provide the output selected by the multiplexer in the header region to the adder.

16. The apparatus of claim 8, wherein the down counter pre-loads a number of sectors per track of the disc and counts down the number of sectors per track in synchronization with the wobble signals.

17. The apparatus of claim 8, wherein the land/groove switching signal generator refers, in order of priority, to the second determination signal, the third determination signal and the first determination signal to generate the land/groove switching signal.

18. The apparatus of claim 8, wherein the land/groove switching signal generator generates the land/groove switching signal to switch a polarity of the land/groove switching signal at a first sector of a next track in response to a determination that a second to last sector of a current track, a last sector of the current track and the first sector of the next track have continuity.

19. The apparatus of claim 8, wherein the land/groove switching signal generator generates the land/groove switching signal to switch a polarity of the land/groove switching signal at a detected switching point in response to the second determination signal generated by the continuity determiner indicating that the physical identification data of the disc has no continuity, one of a second to last sector of a current track, a last sector of the current track and a first sector of a next track is detected and a track switching point is detected from a result of the down counter.

20. The apparatus of claim 8, wherein the land/groove switching signal generator generates the land/groove switching signal to switch a polarity of the land/groove switching signal after a last sector of a current track is detected, in response to the second determination signal generated by the continuity determiner indicating that the physical identification data of the disc has at least a partial continuity.

21. The apparatus of claim 8, wherein the land/groove switching signal generator generates the land/groove switching signal to switch a polarity of the land/groove switching signal after the counted value of the down counter becomes 0, in response to the second determination signal generated by the continuity determiner indicating that the physical identification data of the disc has at least a partial continuity.

22. The apparatus of claim 8, wherein the land/groove switching signal generator generates the land/groove switching signal to switch a polarity of the land/groove switching signal at a sector where phases of the peak header signal and bottom header signal change in response to the second determination signal generated by the continuity determiner indicating that the physical identification data of the disc does not have even partial continuity.

23. A method for generating a land/groove switching signal from pits on a land/groove type disc, in which header information is recorded in a header region in sectors of each track, the header information including physical identification data and a peak header and a bottom header distinguished by envelopes of a peak header signal and a bottom header signal, comprising:

generating a land/groove switching signal from pits on the land/groove type disc; and switching a polarity of the land/groove switching signal according to continuity of the physical identification data of the disc.

24. The method of claim 23, further comprising determining the continuity of the physical identification data based on at least a last sector of a current track and a first sector of a next track.

25. The method of claim 23, further comprising counting the number of wobble headers, wherein the step of switching the polarity of the land/groove switching signal is made according to the number of wobble headers.

26. A method for generating a land/groove switching signal from pits on a land/groove type disc having tracks with wobbles, in which header information is recorded in sectors of each track, the header information including physical identification data and a peak header and a bottom header distinguished by envelopes of a peak header signal and a bottom header signal, both the peak and bottom header signals having phases corresponding to lands or grooves, comprising:

(a) comparing the phases of the peak header signal and the bottom header signal to determine a land/groove switching point;

(b) checking three bits of the physical identification data to determine if these bits consecutively represent a second to last sector of a current track, a last sector of the current track and a first sector of a next track to determine the land/groove switching point; and (c) down-counting the number of sectors included in each track based on the number of wobble signal cycles reproduced from the disc to determine the land/groove switching point; and (d) generating said land/groove switching signal according to the comparison of operation (a), the sequence of sectors determined in operation (b), and the number of sectors counted in operation (c).

27. The method of claim 26, wherein if the three bits consecutively represent the second to last sector of the current track, the last sector of the current track and the first sector of the next track, the track switching point is determined to be at the first sector of the next track.

28. The method of claim 26, wherein if one of the three bits are detected as the second to last sector of the current track, the last sector of the current track, or the first sector of the next track, and the down-counted number is equal to 0, the track switching point is determined to be at the first sector of the next track.

29. The method of claim 26, wherein if the three bits are at least consecutively detected as the second to last sector of the current track and the last sector of the current track, or as the last sector of the current track and the first sector of the next track, the track switching point is determined to be at the first sector of the next track regardless of the down-counted number.

30. The method of claim 26, wherein if the three bits are not consecutive, the track switching point is determined at a point where the phases of the peak header signal and the bottom header signal switch.

* * * * *